United States Patent [19]

Tobin, Jr.

[11] Patent Number: 4,466,189

[45] Date of Patent: Aug. 21, 1984

[54] ANGLE MEASURING DEVICE

[76] Inventor: Leo W. Tobin, Jr., c/o Sovran Bank, N.A., 3401 Columbia Pike, Arlington, Va. 22204

[21] Appl. No.: 268,294

[22] Filed: May 29, 1981

[51] Int. Cl.³ .............................................. G01C 1/00
[52] U.S. Cl. ..................................... 33/267; 33/1 T; 33/1 PT; 324/208; 250/231 SE
[58] Field of Search ....................... 33/1 PT, 1 T, 267; 324/208; 250/231 SE

[56] References Cited

U.S. PATENT DOCUMENTS

| | | | |
|---|---|---|---|
| 2,770,798 | 11/1956 | Roth | 33/1 PT |
| 2,930,895 | 3/1960 | Kuehne | 33/1 PT X |
| 2,940,171 | 6/1960 | Steele | 33/1 PT |
| 3,096,444 | 7/1963 | Seward | 33/1 PT |
| 4,072,893 | 2/1978 | Huwyler | 33/1 PT X |
| 4,136,955 | 1/1979 | Aeschlimann et al. | 33/1 PT X |
| 4,318,225 | 3/1982 | Jenkinson | 33/1 PT |

Primary Examiner—William D. Martin, Jr.
Attorney, Agent, or Firm—Felfe & Lynch

[57] ABSTRACT

An angle measuring device includes a mechanism rotatable to define an angle to be measured and a rotating scanner for producing a first number of pulses corresponding to the angle to be measured. The first number of pulses is frequency multiplied to a second, higher number of pulses to decrease the magnitude of measured angle per pulse and thereby increase the accuracy of the resulting measurement. The second number of pulses are counted, converted to an angle value and held in a display for convenient reading. Preferably, the rotatable mechanism is a gun-like member with sights for aiming it at a target the angle to which is to be measured and a trigger for actuating the measuring, and at least the gun-like member is gimbal mounted to adapt the device for use as a pelorus on a ship.

13 Claims, 6 Drawing Figures

ANGLE MEASURING DEVICE

BACKGROUND OF THE INVENTION

The present invention relates to an angle measuring device and in particular a device which is useful as a navigation aid.

There is a need in navigation for a device capable measuring of relative bearings to navigation aids or other appropriate targets with respect to the center line of a ship or other free moving vessel. Devices known as a Pelorus, an Alidade or a synchronous Alidade are well known instruments for this purpose as is known by those skilled in the art of navigation.

The principal difficulty encountered in using a conventional Pelorus is maintaining or fixing an accurate sight on a target during rough water conditions. For this reason, the Alidade and synchronous Alidade were developed, they provide gyro stability to the instrument to improve maintaining the sight. These improvements however do not totally eliminate the very human difficulty of operation when the ship is pitching or rolling and further, in the absence of a gyro repeater to provide the ships heading when taking a sight, deriving true bearing information from the Pelorus relative bearing information is extremely difficult requiring considerable cooperation between the Pelorus operator and the helmsman.

SUMMARY OF THE INVENTION

The main object of the present invention is to provide an angle measuring device which is capable of freezing a bearing in a digital display so as to avoid the disadvantages of conventional angle measuring devices, particularly those used in navigation.

The concept of the present invention makes use of the surprising fact that although one has difficulty in using a Pelorus to take a bearing in rough water, it has been observed that it is a relatively simple feat for the average marksman to consistently hit an object floating on the rough water with a rifle or a pistol.

The device according to the present invention utilizes this phenomon by providing a device which combines the features of a Pelorus and a gun to take a bearing. The present invention enables the user to shoot a bearing and freeze the bearing in a digital display. The fact that the bearing is frozen in digital format also allows the electronic addition of the ships heading obtained from a digital compass at the time of the shooting of the sight to provide a true bearing display.

The device according to the present invention also has application where angular measurement is desired, such as a surveyors transit, a drafting machine, a sextant and other similar applications where the angular position of a shaft is to be measured. In the application to a navigation sextant, which requires accurate knowledge of the time of the shot and which also presents the same problem in rough sea measurement, providing the simultaneous freezing of the digits displayed on an electronic clock offers obvious advantages in accuracy and ease of use.

In accordance with the present invention, the device includes a scanning disc which is rotatably driven at a high speed by a motor and which has a zero mark a reflecting shield, and 36 angle mark which are rotatable with the disc. A zero mark sensor senses the zero mark and produces one pulse per revolution of the scanning disc, while an angle mark sensor senses the passing of the angle marks and produces 36 pulses per revolution of the scanning disc. The 36 pulses each correspond to an angle of 10° and since a greater accuracy is needed, the output from the angle mark sensor is preferably fed to a phase locked loop frequency multiplier. It multiplies the frequency 100 times to obtain a 3600 pulse per revolution output with a resultant 0.1° accuracy.

The angle to be measured is "hot" by a gun shaped device having sights and a trigger which is a switch which produces a pulse upon actuation. The gun shaped device is rotatably mounted with a position disc which has an optical sensor thereon. When the reference object is lined up in the sights (which is when the trigger is pulled), the optical sensor is positioned relative to the zero mark sensor.

When the trigger is pulled, a counter is enabled and awaits the first zero mark pulse to initiate counting. The counter then counts those of the 3600 pulses per revolution generated by the frequency multiplier occurring before the scanning disc, via the reflecting shield, actuates the optical sensor which produces a pulse stopping the counter. The resulting count is representative of the angle of the gun relative to the zero mark. The count is then digitally displayed as the measuring angle.

These and other objects and advantages of the present invention will become apparent to those skilled in the art as a result of the detailed description of the invention when taken with reference to the accompanying drawings wherein:

DETAILED DESCRIPTION OF THE INVENTION

Figure 1:
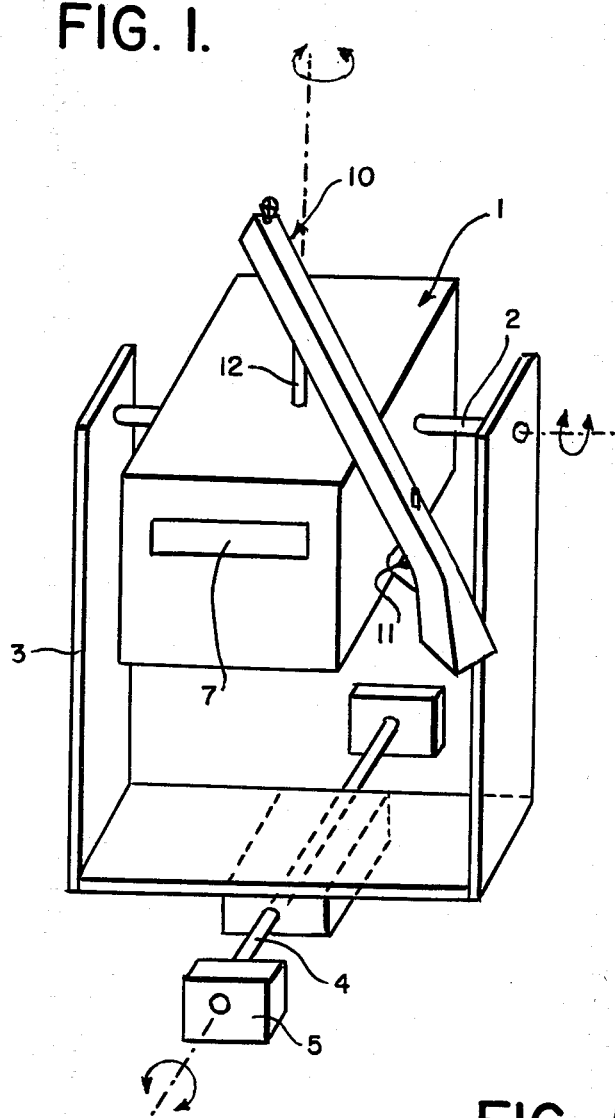
FIG. 1 is a perspective view of the device according to the present invention.
Figure 3:
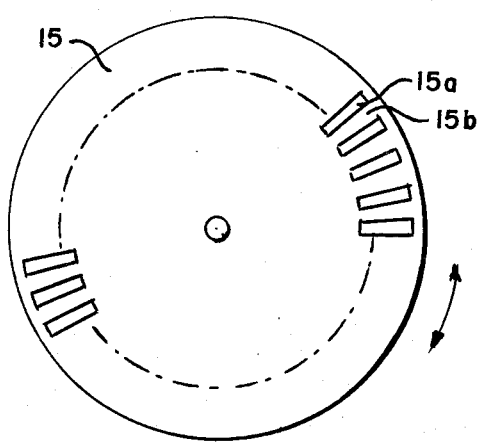
FIG. 3 is a bottom view of the scanning disc of FIG. 2.
Figure 2:
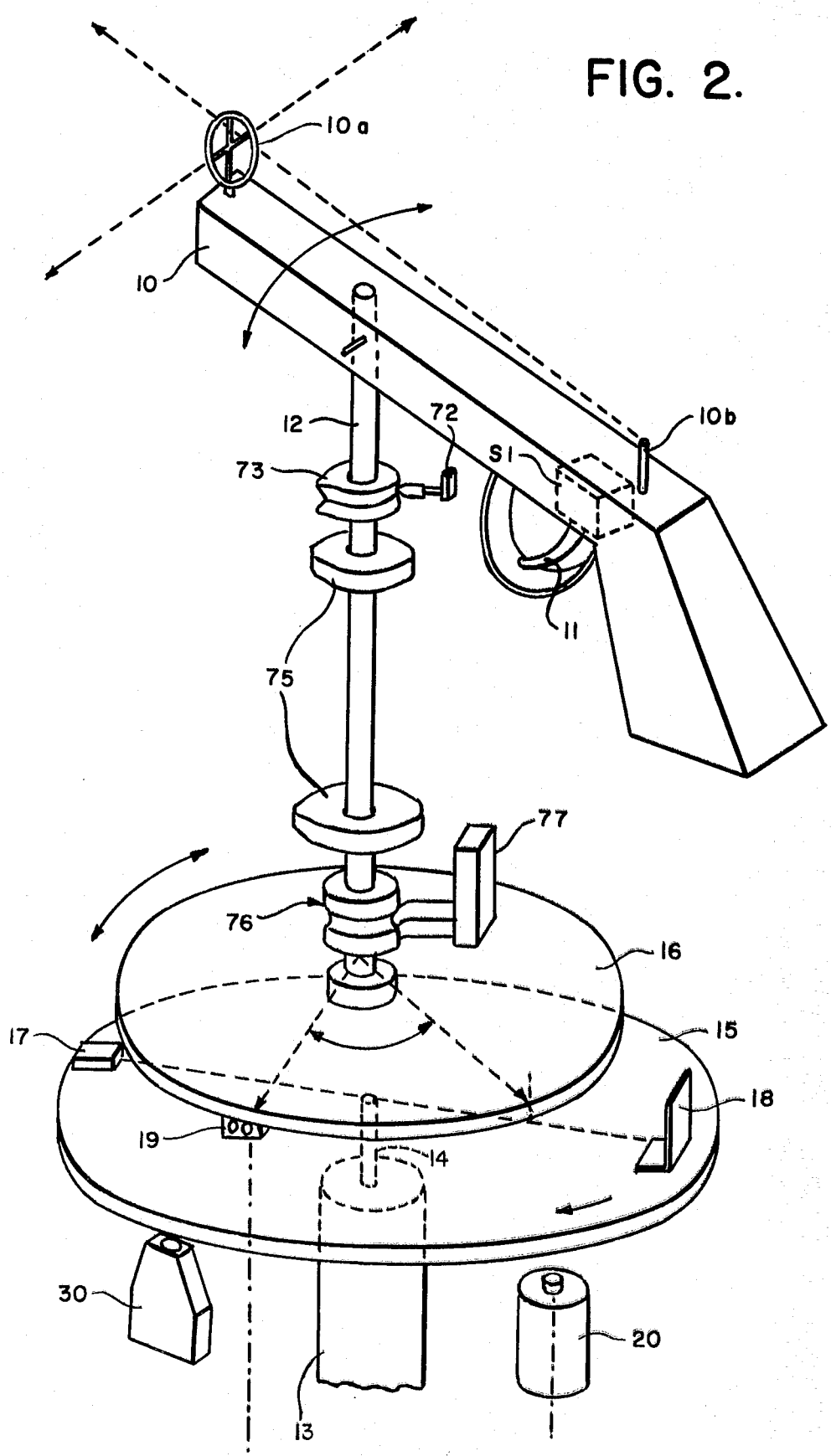
FIG. 2 is a perspective view of a portion of the apparatus shown in FIG. 1.

Referring now to FIGS. 1-3, the mechanical elements of the device according to the present invention are shown in detail.

As shown, a sighting gun 10, which in effect is a direction finding member advantageously configured to have the shape of a pistol, is pivotally connected to shaft 12 for rotation with respect to housing 1. The shaft 12 is an extension of the angle measuring mechanism in housing 1. The housing 1 is suspended in a gimbal support mechanism including elements 2, 3, 4 and 5, the last of which is suitably fastened to, for example, a ship's structure (not shown). This gimbal system allows the top plane of the housing 1 to be maintained manually in a horizontal plane during measurement when the ship is pitching and rolling by force applied to the gun 10.

The gun 10 is provided with sights 10a, 10b for shooting the bearing. The gimbal configuration is also structured to inhibit rotation of the housing 1 with shaft 12.

Within the housing 1 is the angle measurement mechanism which generates the signals required to measure the angular position of the gun and shaft 12 with respect to a frame of reference for example, a ship's structure. Aside from the sighting devices 10a, 10b, the gun 10 includes a trigger mechanism 11 which actuates an electrical switch S1 when the trigger is pulled.

The shaft 12 is supported by two bearings 75 as well as a locking ring 73 having a locking nut 72 thereon and as a result, the shaft 12 is held rigid in the longitudinal direction with respect to the housing 1 while being enabled to rotate.

Connected to the end of the shaft 12 opposite from the gun 10 is disc 16 which is also fixedly attached to the shaft 12 so that it rotates therewith. Mounted on the disc 16 at its periphery is a reflective optical sensor 19 which contains both an infrared light source (LED) and a photo transistor physically arranged in such a manner that the infrared beam from the source can be reflected back and detected by the photo transistor when an object is placed in front of the device at a finite distance therefrom. If no reflecting object is present in front of the device 19, no energy is reflected back and no signal is detected. Disc 16 is also provided with a slip ring assembly 76 and a brush assembly 77 to bring the electrical signals and power to and from the optical device 19.

Immediately below the disc 16 and concentric therewith, is disc 15 which is mounted on and rotated by shaft 14 of electric motor 13. The shaft of motor 13 is colinear with the axis of shaft 12. Mounted on the periphery of disc 15 is a reflective plate 18 having dimensions and radial positions such that as disc 15 is rotated by motor 13, plate 18 will pass in front of the optical sensor 19 once per revolution of disc 15 and at a proper distance from the sensor 19 so as to reflect the infrared beam back to the photo transistor and generate an electrical signal. Due to the speed of rotation of the disc 15, the detected signal in sensor 19 will produce a pulse of relatively short duration, however, the leading edge of the pulse is all that is utilized in the circuitry described hereinafter so that the duration is irrelevant. Also located on disc 15 at its periphery is a small magnetic 17 which when rotated by the disc 15 over sensing coil 20, will generate a voltage pulse in coil 20 the instant it passes thereover. Coil 20 is securely fastened to the housing 1 such that its location is immovable with respect to housing 1 which is in turn maintained in an irrotational condition with respect to the frame of reference, that is, the ship's center line. Thus coil 20 generates a zero reference positional signal when magnet 17 passes over it, which makes the position of the magnet a zero reference point on disc 15 having a known angular relationship with respect to the reflecting plate 18. Plate 18 can be located anywhere around the periphery of disc 15, however it is particularly advantageous to locate it 180° from the magnet 17 to provide a counter balance to magnet 17 to overcome and imbalance of the unequal centrifical force and resulting vibration produced when disc 15 is rotated at high speed. While a coil is specified herein, it is understood that other devices such as a Hall generator, photodetector, etc. could be used.

On the other side of the disc 15 are printed 36 black and 36 white radial sector stripes 15a, 15b. The stripes are equally spaced around the disc 15. While the number of stripes selected have been chosen so that each stripe subtends an angle of 5°, it is clear to one skilled in the art that other quantities of stripes could be utilized and still enable the system to work within the scope of the invention.

Below the disc 15 is disposed an optical sensor 30 which is used to sense the varying degrees of reflection obtained from the black and white stripes as they pass in front of the sensor 30 as the disc 15 is rotated by motor 13. The resulting signal produced by the sensor 30 for the embodiment herein is a square wave of 36 cycles per revolution of the disc 15 and having a frequency which is a function of the speed of the motor. For example, if the motor speed is 2000 rpm, the square wave output of sensor 30 will have a frequency of 1200 Hz and regardless of the speed of the motor 13, the sensor 30 will always generate 36 pulses per revolution of the disc 15. While sensor 30 is an optical sensor, it will be realized that other devices sensing capacitance or a magnetic field could be used.

The signal generated by the sensor 30 has an important relationship to the signal generated by the zero mark sensor 20 and the sensor 19, as will be explained. When the sensor 19 is rotated by the gun 10 to a position diametrically across disc 15 from the position of coil 20, it can be seen that the coil 20 and the sensor 19 will produce pulses independently and simultaneously. This corresponds to a zero position or reading. If the sensor 19 is then rotated such that it lies directly above coil 20, a pulse will be generated by coil 20 when magnet 17 passes over it, but sensor 19 will not generate a pulse until disc 15 goes through a half turn to locate plate 18 in position for the sensor 19. In this half turn of disc 15, sensor 30 will have generated 18 square wave pulses corresponding to 180° change in location of sensor 19. Each square wave pulse from sensor 30 thus represents 10° and counting the number of pulses generated by the sensor 30 between the pulse generated by coil 20 and the pulse generated by sensor 19 is indicative of the angle between a physical plane through coil 20 and a similar plane through sensor 19. It can thus be seen that the number of pulses corresponds to a means for measuring this angle and that the zero pulse can be situated to have a fixed relationship with respect to a ships structure.

Since only 36 square wave pulses occur per revolution of the disc 15, the angle to be measured can only be measured within an accuracy of 5° or 10°. One could increase the number of stripes 15a, 15b to, for example 360, and thus the angle could be measured to within 0.5° or 1° by counting either half cycles or whole cycles respectively. Moreover, a higher frequency will produce even greater resolution, however such an approach has its physical limitations. The present invention, however, effectively increases the number of stripes electronically.

Figure 5:
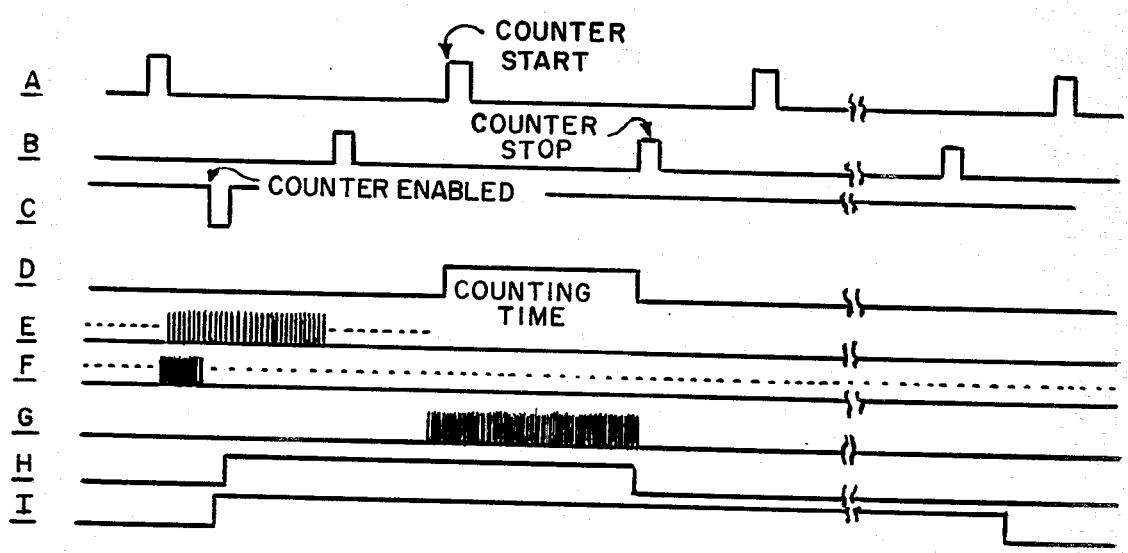
FIG. 5 is a timing diagram of various signals shown in FIGS. 4 and 6.
Figure 4:
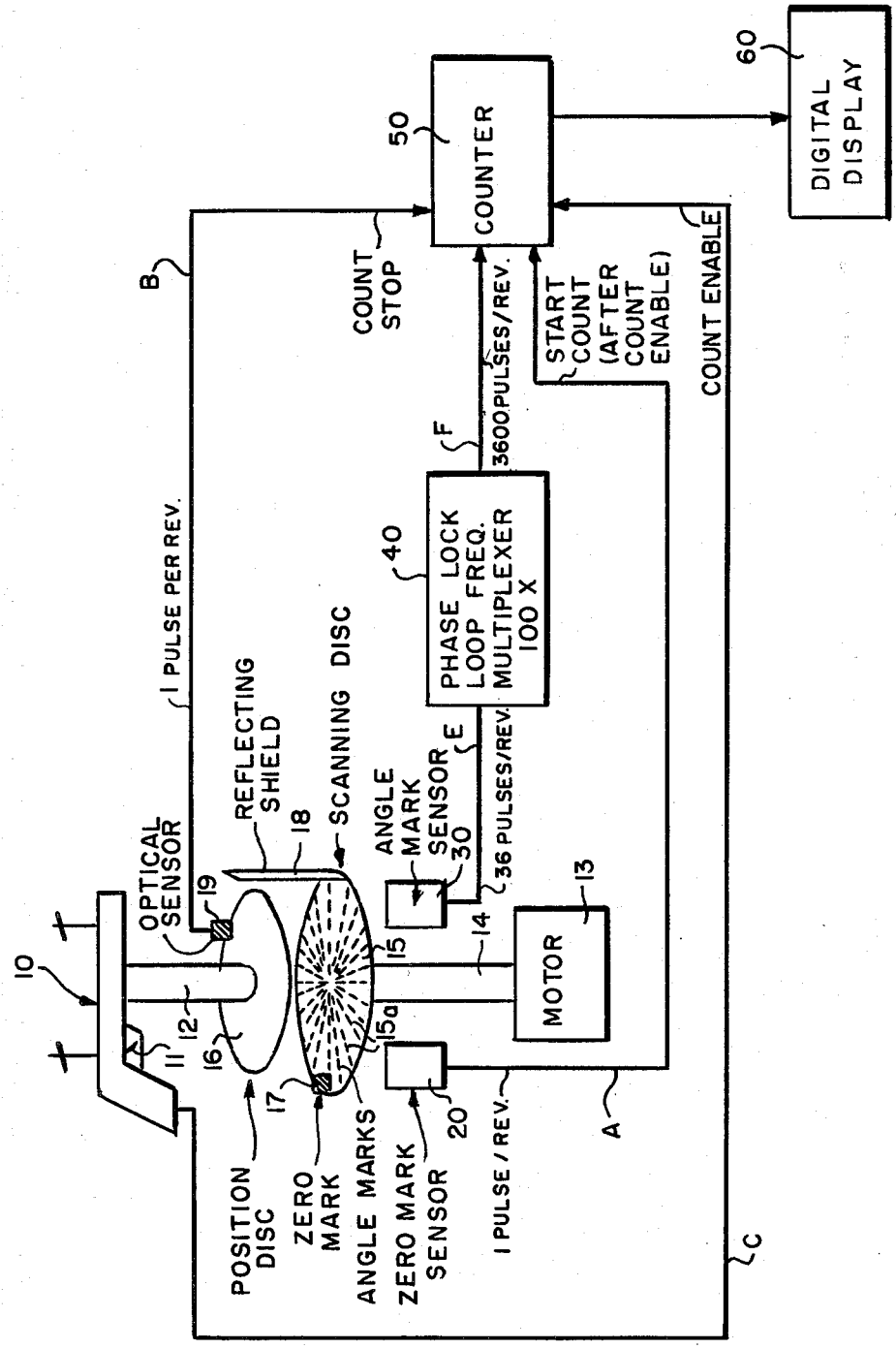
FIG. 4 is a schematic representation of the device according to the present invention.
Figure 6:
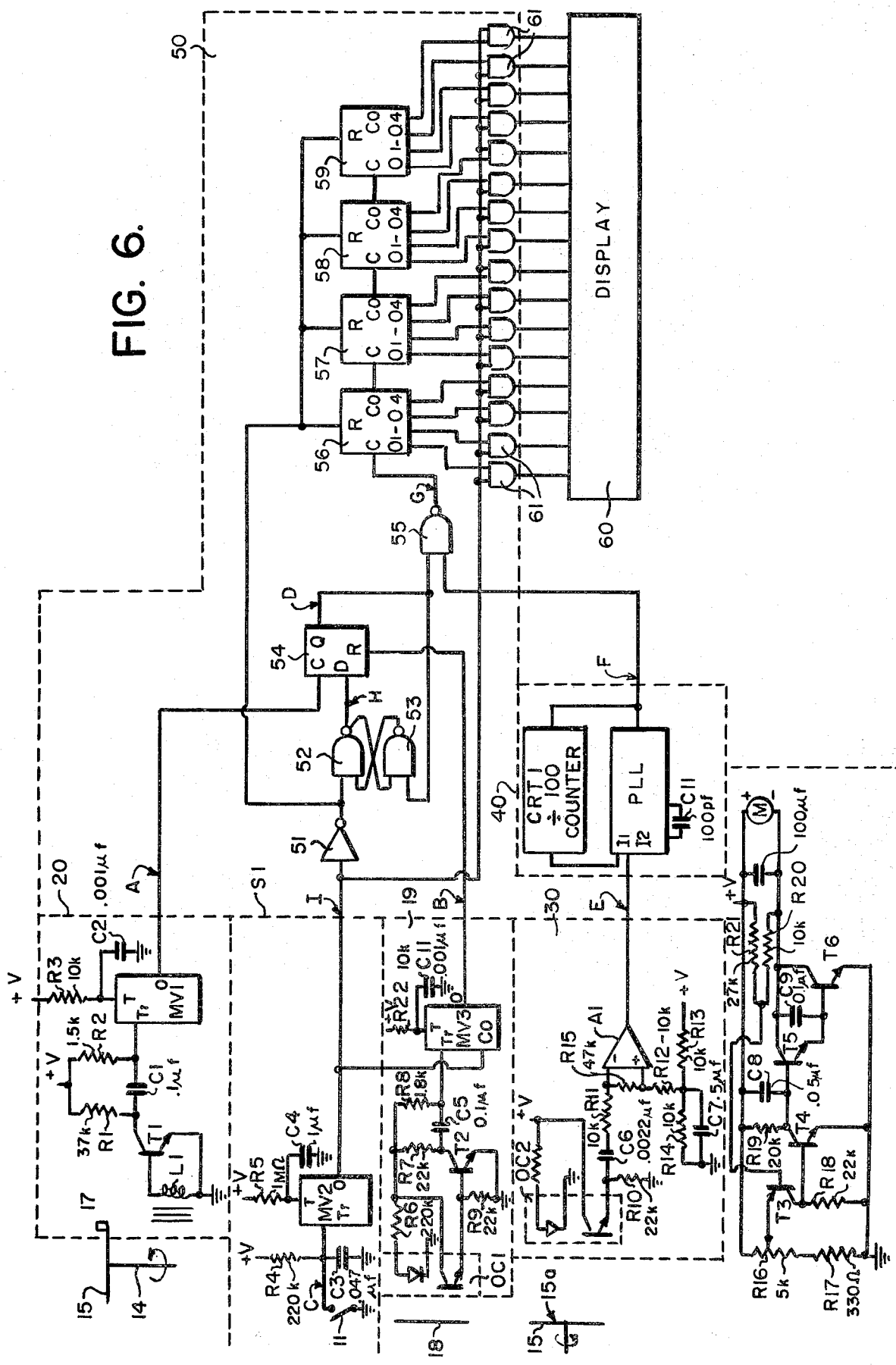
FIG. 6 is a detailed circuit block diagram of the device according to the present invention.

The accuracy of the system is increased according to the present invention as shown in FIGS. 4–6. FIG. 4 shows a block diagram of the system in its basic form. FIG. 5 is a timing diagram showing signals in FIG. 4 and FIG. 6 is a detailed circuit diagram of the structure shown in FIG. 4 with the timing diagram of FIG. 5 also referring to the signals generated therein.

As shown in FIG. 4, the 36 square wave pulses per revolution (signal E) are fed from the angle mark sensor 30 to a phase lock loop frequency multipler 40. The phase lock loop electronically locks a multiple of the input frequency over a wide range of variations which result from possible variations in the speed of the motor 13 during the driving of disc 15.

The angle mark sensor 30 and the phase lock loop 40 are shown in more detail in FIG. 6. As shown therein, the optical sensor OC2 feeds its signals into an operational amplifier A1 so as to pulse shape the signals derived therefrom for input into the phase lock loop. The input end of the amplifier A1 includes resistors R10-R15 and capacitors C6-C7 having the values shown. The output signal from amplifier A1, signal E, is fed to the input of a phase lock loop (motorola 4046 or equivalent) which has its output fed through divide by 100 counter CTR1 to provide the dividing feedback to the phase lock loop. Capacitor C11 is utilized to stabilize the phase lock loop at the freqencies used. Output signal F corresponds to 100 times the input frequency and thus the output of the multiplier 40 produces 3600 pulses per revolution, each corresponding to 0.1° of resolution for a full cycle of the input square wave.

It can be easily seen that further precision can be obtained by merely increasing the dividing ratio of counter CTR1.

The zero mark sensor 20 is also shown in FIG. 6 in more detail and comprises an induction coil L1 for sensing magnet 17 and which is followed by transistor T1 (all transistors herein are 2N2222) whose output is pulse shaped by resistors R1, R2 and capacitor C1 and which is fed into a one shot multi vibrator NV1 having a timing period defined by resistor R3 and capacitor C2 so as to produce a counter start pulse (signal A).

The switch S1 includes the physical trigger mechanism 11 followed by pulse shaping circuitry C3 and R4 and by a second multi-vibrator MV2 whose time constant is determined by resistor R5 and capacitor C4. The output of the switch 11 is shown as waveform C which is a negative going relatively short pulse and multi-vibrator MV2 produces pulse wave form I which is a relatively long positive going signal which is triggered by the pulse generator from switch 11.

The optical sensor 18 comprises the optical coupler OC1 whose output signals are pulse shaped and amplified by resistors R6-R9 and capacitor C5 in conjunction with transistor T2. The output of the pulse shaping network is fed to the input of one shot multi-vibrator MV3 whose timing is set by resistor R22 and capacitor C11. Multi-vibrator MV3 also has a enable input connected to the output of multi-vibrator 2 so that an output will only appear from multi-vibrator 3 when a signal I is present. The output of multi-vibrator 3 is signal B which is a relatively short pulse corresponding to the counter stop condition.

Motor 13 includes the motor winding M which is driven by the motor speed control circuit shown in FIG. 6 and comprising resistors R16-R21 and capacitors C8-C10 along with transistors T3-T6. The circuit as shown therein is a conventional motor driving circuit and will not be discussed in any further detail.

The counter 50 for counting the signals generated by the various sensors described hereinbefore is shown in detail in FIG. 6. D flip-flop 54 has its clock input fed by the output of multi-vibrator MV1 (signal A) and has its reset input connected to the output of multi-vibrator MV3 (signal B). The D input of the flip-flop 54 has fed thereto signal I which is inverted through inverter 51 and which is also fed through a set reset flip-flop including NAND gates 52, 53. The reset input of the set reset flip-flop comprises the output Q of the D flip-flop 54 which is fed to one input of NAND gate 53. This circuitry in conjunction with NAND gate 55 which has as its inputs the output signal F of the phase lock loop PLL and the output (signal D) of flip-flop 54 serve to control the series connected counters 56-59. The output of inverter 51 is fed to the reset inputs of all of the counters 56-59 and the output of gate 55 (signal G) is fed to the clock input C of the first counter 56. The carry out outputs of each of the counters 56-58 are connected to the respective clock inputs of counters 57-59 respectively.

In operation, after the switch 11 has been actuated, that is the angle has been shot, signal I is generated setting the set reset flip-flop constituting gates 52, 53 and thus raising the data input of flip-flop 54 to the logic 1 state as indicated by signal H. When the first counter start signal (signal A) is received from the sensor 20, the flip-flop 54 has the logic 1 input clock therein and the output thereof (signal B) rises to a logic 1. Signal D constitutes the counting time for the system.

The raising of signal D to a logic 1, enables the 3600 pulses per revolution (signal F) to be input through gate 55 into the clock input of the counters 56-59 as shown in signal G and enabling them to count these pulses. As soon as the counter stop signal B is received from sensor 19, flip-flop 54 is reset thus disenabling gate 55, and resetting the set reset flip-flop of gates 52, 53. Thus no further counter start signals (signal A) will be able to raise the output of flip-flop 54 until the angle has again been shot, i.e. until after the trigger 11 is again actuated.

Since the clock input to the counters 56-59 has been terminated, the final count therein indicates the number of pulses received during the counting time and which is directly proportional to the angle position of the gun 10. In the preferred embodiment of the present invention, since each count corresponds to 0.1°, the displaying of the count with a single decimal place will be directly translated into the actual angle measurement. The data outputs of counters 56-59 which are illustrated as four bit counters are fed through decoder driven gates 61 whose outputs are gated by signal I and thus the final angle count will be displayed in a display 60. The display 60 can be any conventional digital display such as an LED or LCD display. The multi-vibrator MV2 is set so that signal I will remain on for a number of seconds so that the display will hold the final count for a sufficient amount of time to enable one to read same. Additionally, due to the circuitry as described, any attempt to shoot another angle during the time that the display is enabled will not be possible since the multi-vibrator MV2 will not trigger again. The falling of signal I also resets counters 56-59.

One skilled in the art will recognize that for certain applications of the device, the single pulse producing capability of switch 11 and multivibrator MV2 could be modified so that the actuating of switch 11 will produce a continuous train of spaced apart "shooting pulses". Additionally, the provision of a latch storage circuit between counters 56-59 and display drivers 61, would enable the "continuous" display of the angle of the shaft 12 since the contents of the latch circuit could be updated for each revolution of the disc 15 upon the resetting of the counter.

The speed of motor 13 is not critical since the number of counts per revolution of disc 15 remains constant independent of speed and the phase lock loop count multiplier circuit will stay in lock and will track the output over a wide range. The phase lock loop circuit is able to track variations in input over one revolution of disc 15, but it is obviously more desirable to have a constant speed over at least a single revolution of disc 15. The speed at which the motor runs does determine how soon the measurement is taken after the trigger is pulled, which essentially dictates how long the gun must be held on the target after the trigger is pulled for a reading to be taken. The worst case situation would be to pull the trigger just after the magnet 17 had passed over coil 20 which would require holding the gun on target for one complete revolution of disc 15 plus that portion of another revolution equal to the angle being measured. If the angle being measured were 359.9°, this would be almost two revolutions of disc 15, which would take 60 milliseconds at a 2000 rpm motor speed. Although this is an insignificant length of time and falls well within the error of human ability to accurately aim the gun and pull the trigger, higher motor speeds will reduce this measurement time proportionately. Also by reversing the direction of rotation of the motor and interchanging signals A and B the uncertainty time will be cut in half since once the FF 54 is initiated by the signal B, the length of signal D will be fixed regardless of the position or further movement of the gun.

Gimbals have been provided to allow the orientation of shaft 12 to remain vertical during the sight shot. By definition, the true or relative bearing must be measured in the horizontal plane from a line of intersection with a vertical plane on which lies the centerline of the ship. Departure of the ship from course during the reading or thereafter will cause one to wonder what the relative bearing is relative to. If one were to assume that the ship is held fixed on its heading and that either pitch or roll were to be contended with if no gimbals were provided, significant errors would result. To illustrate, assume that the housing 1 were fastened directly to the ship such that the gun could only be rotated. Then assume that the ship only rolled and that it had zero pitch. It is obvious that the gun would only sight into the water since there are no means without gimbals to elevate it. However, let us also assume that we will pivot the gun so it can be elevated in the plane of shaft 12, can then sight the target and make a measurement. In this condition, it can be shown that the angle measured will be in error as follows:

$$\sin c = (\sin a)(1/\cos B)$$

where
angle c = true relative bearing definition
angle B = the roll angle of the deck
angle a = the angle measured under the conditions cited immediately above. From this it can be seen that no error exists if the deck is level and shaft 12 is vertical (angle B=0). It is obvious that this spherical trigonometry equation is also valid for a condition of ship's pitch. However, this exercise also indicates that when using gimbals, the errors generated by the slight departure of shaft 12 from the vertical are minor since the cosine function differs from one and changes slowly for small angles. [10° off vertical will cause approximately 1.5% error in the reading with 5° causing less the 0.4% error]. By providing a cross-hair sight, horizontal alignment with the target with minimal error and effort is allowed.

It is also understood that the present invention can be constructed without the use of gimbals and still provide a practical and operable system. The gimbals can be replaced by the use of a flexible shaft for shaft 12, which while rotationally rigid, can be otherwise flexed. In this manner, the housing 11 can be securely fastened to a ship and if the shaft 12 were extended for example to 8", the sight mounted at the end thereof could be brought into the horizontal plane by the bending of the shaft in any direction from the vertical. Since the shaft is rotationally rigid, any angle through which the sight would turn would produce an equal angular excursion in shaft 12 with no error. Otherwise the embodiment of the invention would be the same, but for the fact that the gimbals have been omitted.

It will be appreciated that the instant specification and claims are set forth by way of illustration and not limitation, and that various changes and modifications may be made without departing from the spirit and scope of the present invention.

What is claimed is:

1. A device for measuring the angle to a target, comprising:
    a gun-like member having sighting and rotatable means for aiming at the target and a trigger switch actuatable for producing a pulse when the gun-like member is aimed at the target;
    sensor means rotatable with the gun-like member about an axis for indicating the rotational position thereof;
    a scanning disc rotating about an axis parallel to the axis of the sensor means and having thereon a zero mark, angle-indicating marks, and shield means, the shield means being cooperative with the sensor means for causing the sensor means to produce a pulse each time the scanning disc rotates the shield means past the sensor means;
    a zero mark sensor fixed on a reference line from the rotational axis of the scanning disc from which the angle to the target is to be measured and cooperative with the zero mark on the disc for producing a pulse each time the scanning disc rotates the zero mark past the zero mark sensor;
    an angle mark sensor fixed relative to the scanning disc for producing a pulse for each angle mark on the scanning disc rotated past the angle mark sensor; and
    a counter means enabled first by the pulse from the zero mark sensor for thereafter counting each pulse from the angle mark sensor until the next pulse is produced by the sensor means,
    whereby the count in the counter is representative of the angle to the target from the reference line.

2. The device of claim 1, wherein the gun means comprises a gun-like member and sights spaced therealong for aiming the gun-like member at the target.

3. The device of claim 1, wherein the trigger switch comprises a trigger on the gun means and a switch actuated thereby.

4. The device of claim 1, wherein the sensor means comprises a shaft fixed to the gun means for rotation therewith, a position disc concentric with the scanning disc, and a sensor on the position disc for indicating the rotational position of the gun means.

5. The device of claim 4, wherein the sensor comprises a light source and photo-sensor and the shield means comprises means for reflecting the light from the source to the photo-sensor.

6. The device of claim 1, wherein the zero mark sensor comprises a magnetic sensor and the zero mark is magnetic.

7. The device of claim 1, wherein the angle marks are optical and the angle mark sensor comprises an optical sensor therefor.

8. The device of claim 1, and further comprising a pulse frequency multiplier for multiplying the frequency of the pulses from the angle mark sensor before they are counted in the counter, whereby the precision of the angle marks is enhanced.

9. The device of claim 8, wherein the pulse frequency multiplier is a phase lock loop multiplier.

10. The device of claim 1, and additionally comprising gimbal means for mounting at least the gun means, whereby the device is adapted for use as a pelorus on a ship.

11. The device of claim 1, and additionally comprising means for displaying the counter count and holding the display for a time sufficient to read the same conveniently.

12. An angle measuring device comprising:

a. means rotatable to a measuring position for defining the angle to be measured;
b. means for producing from the measuring position of the rotatable means a first number of pulses corresponding to the angle to be measured;
c. means for frequency multiplying the first number of pulses to a second, higher number of pulses, whereby to expand the scale and thereby increase the resolution of the resulting measurement;
d. means for counting the second number of pulses; and
e. means for converting the count to an angle value and displaying same.

13. The device in claim 1, wherein the means for frequency multiplying the first number of pulses comprises a phase lock loop frequency multiplier.

* * * * *

UNITED STATES PATENT AND TRADEMARK OFFICE
CERTIFICATE OF CORRECTION

PATENT NO. : 4,466,189
DATED : August 21, 1984
INVENTOR(S) : Leo W. Tobin, Jr.

It is certified that error appears in the above-identified patent and that said Letters Patent is hereby corrected as shown below:

Column 2, line 8, "hot" should be -- shot --.
Column 2, line 24, "measuring" should be -- measured --.
Column 10, line 14, claim 13, "1" should be -- 12 --.

*Signed and Sealed this*

*Thirtieth* Day of *April 1985*

[SEAL]

*Attest:*

DONALD J. QUIGG

*Attesting Officer*     *Acting Commissioner of Patents and Trademarks*

UNITED STATES PATENT AND TRADEMARK OFFICE
CERTIFICATE OF CORRECTION

PATENT NO. : 4,466,189
DATED : August 21, 1984
INVENTOR(S) : Leo W. Tobin, Jr.

It is certified that error appears in the above-identified patent and that said Letters Patent is hereby corrected as shown below:

Claim 1, line 27 after "pulse from the" insert -- trigger switch and then by the next pulse from the --.

Signed and Sealed this

Third Day of September 1985

[SEAL]

Attest:

DONALD J. QUIGG

Attesting Officer     Acting Commissioner of Patents and Trademarks - Designate